(12) United States Patent
Ma et al.

(10) Patent No.: US 12,487,341 B2
(45) Date of Patent: Dec. 2, 2025

(54) METHODS AND SYSTEMS FOR LIDAR WALK ERROR CORRECTION

(71) Applicant: SHENZHEN ADAPS PHOTONICS TECHNOLOGY CO., LTD., Shenzhen (CN)

(72) Inventors: Zhijie Ma, Shenzhen (CN); Chao Zhang, Shenzhen (CN); Kai Zang, Shenzhen (CN)

(73) Assignee: SHENZHEN ADAPS PHOTONICS TECHNOLOGY CO., LTD., Shenzhen (CN)

( * ) Notice: Subject to any disclaimer, the term of this patent is extended or adjusted under 35 U.S.C. 154(b) by 963 days.

(21) Appl. No.: 17/584,027

(22) Filed: Jan. 25, 2022

(65) Prior Publication Data
US 2022/0236386 A1 Jul. 28, 2022

(30) Foreign Application Priority Data
Jan. 25, 2021 (CN) .......................... 202110098686.2

(51) Int. Cl.
*G01S 7/4865* (2020.01)
*G01S 7/4861* (2020.01)
*G01S 17/10* (2020.01)
*H04N 25/705* (2023.01)

(52) U.S. Cl.
CPC .......... *G01S 7/4865* (2013.01); *G01S 7/4861* (2013.01); *G01S 17/10* (2013.01); *H04N 25/705* (2023.01)

(58) Field of Classification Search
CPC ...... G01S 7/4865; G01S 7/4861; G01S 17/10; G01S 7/497; G01S 17/08; G01S 7/486; G01S 17/42; H04N 25/705; H04N 25/77
See application file for complete search history.

(56) References Cited

U.S. PATENT DOCUMENTS

| | | | |
|---|---|---|---|
| 4,263,508 A * | 4/1981 | Leary | G01N 15/147 356/335 |
| 2017/0101954 A1* | 4/2017 | Krüger | G01K 7/36 |
| 2018/0259645 A1 | 9/2018 | Shu et al. | |
| 2021/0132197 A1* | 5/2021 | Wachter | G01S 7/4802 |

FOREIGN PATENT DOCUMENTS

| | | |
|---|---|---|
| CN | 110537124 A | 12/2019 |
| CN | 111836570 A | 10/2020 |

OTHER PUBLICATIONS

Kostamovaara et al. "On the minimization of timing walk in industrial pulsed time-of-flight laser radars" (Year: 2014).*
Hua et al. "Correction of range walk error for underwater photon-counting imaging" (Year: 2020).*
The Second Office Action dated Aug. 6, 2025 for Chinese Application No. 202110098686.2.

* cited by examiner

*Primary Examiner* — Assres H Woldemaryam

(57) ABSTRACT

A method for walk error correction in a lidar system. A preliminary peak location of a received laser pulsed is compared to a threshold. If the preliminary peak location is within the threshold, walk error correction is applied. A pulse starting point is obtained by locating a predetermined number of consecutive increasing intensity values. A corrected peak location is obtained using the pulse staring point, and it is used for time of flight calculation. There are other embodiments as well.

20 Claims, 6 Drawing Sheets

METHODS AND SYSTEMS FOR LIDAR WALK ERROR CORRECTION

CROSS-REFERENCES TO RELATED APPLICATIONS

The present invention claims priority to China Patent Application No. 202110098686.2, filed Jan. 25, 2021, which is commonly owned and incorporated by reference herein for all purposes.

BACKGROUND OF THE INVENTION

The present invention relates generally to sensing devices.

Research and development in integrated microelectronics have continued to produce astounding progress with sensor devices. Many examples of photodiodes exist. For example, a photodiode is a p-n junction or PIN structure. When a photon of sufficient energy strikes the diode, it creates an electron-hole pair. This mechanism is also known as the inner photoelectric effect. If the absorption occurs in the junction's depletion region, or one diffusion length away from it, these carriers are swept from the junction by the built-in electric field of the depletion region. Thus, as holes move toward the anode (electrons move toward the cathode), a photocurrent is produced. The total current through the photodiode is the sum of the dark current (current that is generated in the absence of light) and the photocurrent, so the dark current must be minimized to maximize the sensitivity of the device.

Another example of a photodiode is called an "avalanche photodiode". The avalanche photodiodes are photodiodes with a structure optimized for operating with high reverse bias, approaching the reverse breakdown voltage. This allows each photo-generated carrier to be multiplied by avalanche breakdown, resulting in internal gain within the photodiode, which increases the effective sensitivity of the device. A type of photodiode—usually referred to as a single-photon avalanche diode (SPAD) device—has been gaining popularity and used in a variety of applications, such as lidar systems that have become a mainstream component of consumer electronics, automobiles, and other applications. There are many challenges, such as walk error, that adversely affect the accuracy of lidar systems.

From the above, it is seen that techniques for improving lidar systems are highly desired.

BRIEF SUMMARY OF THE INVENTION

A method for walk error correction in a lidar system. A preliminary peak location of a received laser pulsed is compared to a threshold. If the preliminary peak location is within the threshold, walk error correction is applied. A pulse starting point is obtained by locating a predetermined number of consecutive increasing intensity values. A corrected peak location is obtained using the pulse staring point, and it is used for time of flight calculation. There are other embodiments as well.

It is to be appreciated that embodiments of the present invention provide many advantages over conventional techniques. Among other things, the walk error correction techniques according to embodiments of the present invention meaningfully improve the accuracy of lidar systems.

Embodiments of the present invention can be implemented in conjunction with existing systems and processes. For example, the walk error correction techniques according to the embodiments of the present invention can be used in a wide range of existing lidar systems and devices.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

A method for walk error correction in a lidar system. A preliminary peak location of a received laser pulsed is compared to a threshold. If the preliminary peak location is within the threshold, walk error correction is applied. A pulse starting point is obtained by locating a predetermined number of consecutive increasing intensity values. A corrected peak location is obtained using the pulse staring point, and it is used for time of flight calculation. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
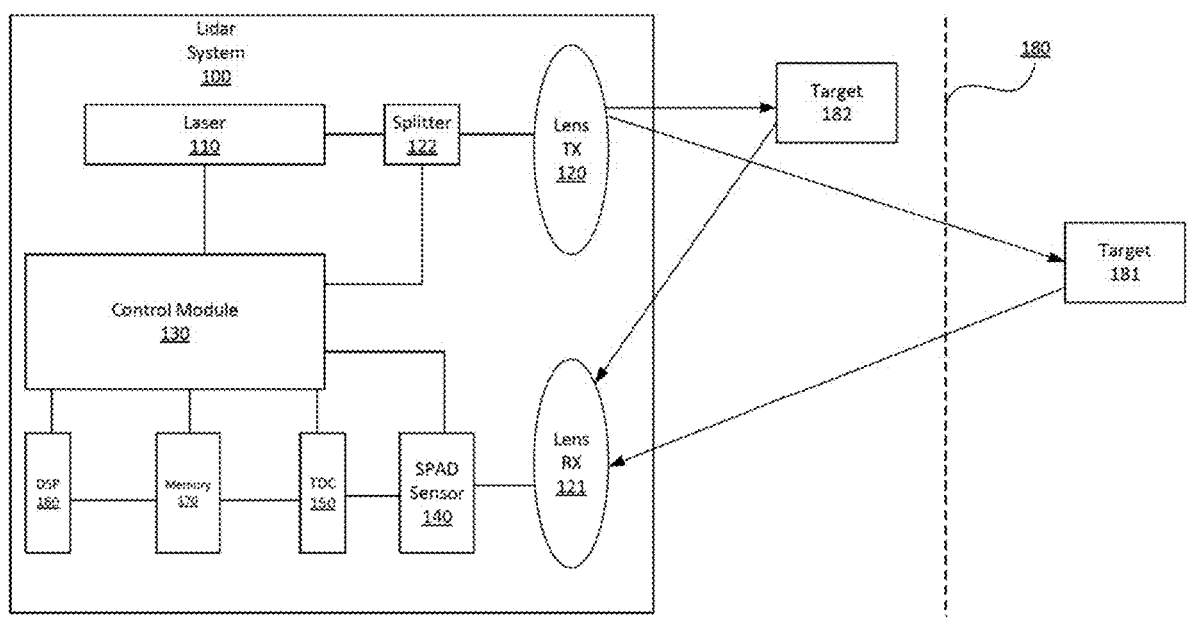
FIG. 1 is a simplified block diagram illustrating lidar system 100 according to embodiments of the present invention.

FIG. 1 is a simplified block diagram illustrating lidar system 100 according to embodiments of the present invention. This diagram is merely an example, which should not unduly limit the scope of the claims. One of ordinary skill in the art would recognize many variations, alternatives, and modifications. In principle, lidar system 100 measures distance by calculating the time differences between transmitted light signals and the corresponding received signals. Laser 110, as controlled by the control module 130, emits laser pulses at predefined intervals. As example, laser 110 may include stacked laser diodes that emit diffracted laser beams. Depending on the application, the output of laser 110 may be pulsed infrared laser signals. The laser pulse profile (e.g., width, shape, intensity, etc.) and the predefined intervals depend largely on the lidar system implementation and specifications, such as power, distance, resolution, and others.

In various embodiments, the laser pulse profile is optimized and used for walk error correction. More specifically, as explained below, a corrected peak location of a received laser pulse is derived from the laser pulse starting point and a total rise time. In a specific embodiment, the distance between the pulse starting point and the pulse peak may be referred to as a total rise time R, which may be later used to calculate a corrected peak location. For various implementations, the total rise time of the reflected laser pulse signal, measured at a distance that is minimally affected by walk error, may be more accurate for the purpose of calculating a corrected peak location, which involves adding the total rise time to a calculated (e.g., using consecutive rising intensity values) pulse starting point.

The profile of the transmitted laser pulse, in some implementations, is specifically optimized for later processing that corrects walk error. Walk error correction, according to embodiments of the present invention, involves locating the pulse starting point. Locating the pulse starting point involves finding consecutive rising intensity values stored in a histogram, and it is easier to find consecutive rising intensity values when the laser pulse profile is characterized by a "steep slope" (thus high signal-to-noise ratio and reduced likelihood of downward glitches). For example, the "steep slope" refers to a fast rise time (i.e., a short rise time relative to the peak intensity).

The need for walk error correction depends on various characteristics of the laser pulse and the specific application. For example, a smartphone lidar often has a relatively short effective range (e.g., less than five meters), and the walk error correction is needed for targets that are positioned at less than one meter away from the lidar. A vehicle's lidar with an effective range of over 100 meters may need walk error correction for objects that are positioned less than five meters away. Lidar systems according to embodiments of the present invention are configured to perform walk error correction only for objects that are positioned within a predetermined threshold distance. For example, threshold distance 180 is shown in FIG. 1, where walk error correction is needed for target 182 and not needed for target 181.

Lidar system 100 is configured to reconstruct images, with distance information, using a SPAD array that includes many SPAD pixels. For this application, the output of the laser 110 is manipulated to create a predefined pattern. It is understood that lens 120 refers to an optical module that may include multiple optical and/or mechanical elements. In certain implementations, lens 120 includes diffractive optical elements to create a desired output optical pattern. Lens 120 may include focusing and optical correction elements.

Control module 130 manages operations and various aspects of lidar system 100. As shown, control module 130 is coupled to laser 110 and splitter 122, along with other components. Depending on the embodiment, control module 130 can be implemented using one or more microprocessors. Components such as TDC 150 and digital signal processor (DSP) 160 as shown are functional blocks that are—on the chip layer—implemented with the same processor(s) for the control module 130. In addition to providing control signal signals to laser 110, control module 130 also receives the output of the laser 110 via splitter 122. Based on the output of splitter 122, control module 130 activates SPAD sensor 140, TDC 150, and other components to process received signals. Additionally, the output of splitter 122 provides the timing of the outgoing light signal, and this timing information is later used in ToF calculations.

The transmitted laser signal, upon reaching target 181 or 182, is reflected. The reflected laser signal is received by lens 121, which focuses the received laser signal onto SPAD sensor 140. Lens 121 may include multiple optical and mechanical elements. SPAD sensor 140 converts the received laser signal to arrival signal pulses. For certain applications, only a single SPAD pixel is needed for range determination, and a single TDC is implemented for the SPAD pixel. In various embodiments, SPAD sensor 140 is implemented as a macro pixel that is commonly referred to as a digital silicon photomultiplier (dSiPM). TDC 150 includes a number (e.g., equal to the number of SPAD pixels) of TDCs that are configured to process the arrival time of multiple pulses generated by SPAD sensor 140. For example, TDCs of block 150 may be individually coupled to their corresponding SPAD pixels of block 140.

The output of TDC 150 is stored at memory 170 as a histogram data structure. For example, in a histogram data structure, memory blocks correspond to predefined time bins, and each of the memory blocks stores an intensity value (e.g., number of photons received within a predefined time interval). As an example, the histogram data stored at memory 170 is a representation of the received laser pulse reflected from the target object (e.g., target 181 or target 182). For example, memory 170 may include static random-access memory (SRAM), but other types of memory devices may be used as well.

Figure 2:
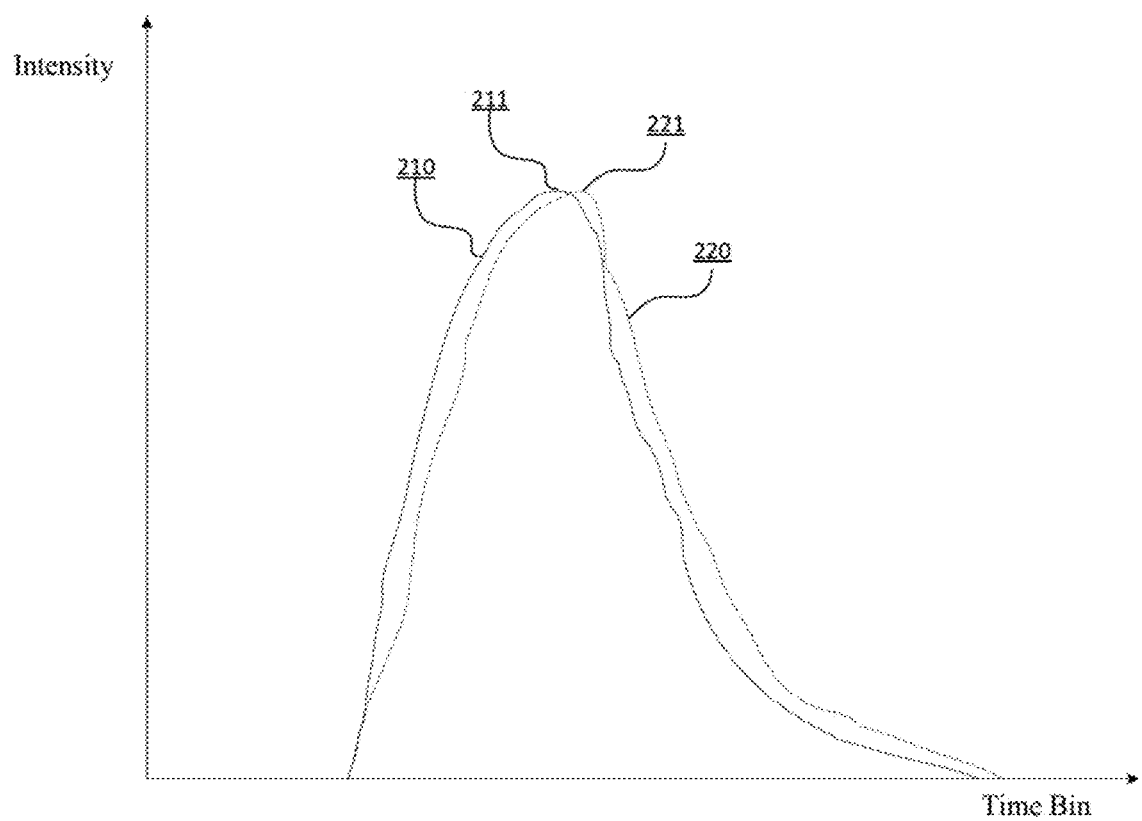
FIG. 2 is a simplified diagram illustrating walk error associated with lidar systems.

FIG. 2 is a simplified diagram illustrating walk errors associated with lidar systems. The reconstructed laser pulse (converted to electrical signal by SPAD sensor 140 and converted to histogram data by TDC 150). For the purpose of illustration, plot 210 represents the received laser pulse without walk error, and plot 220 represents a received laser pulse with walk error.

As an example, the term "walk error" refers to a correctable system error in a lidar system that depends on a target object's range and reflective surface, both of which affect the pulse-return intensity. Within a certain range (e.g., target 182 inside threshold 180 in FIG. 1), a received laser pulse's peak tends to shift (e.g., from location 211 on plot 210 to location 221 on plot 220). The shift in peak location sometimes translates to over ten time bin units, and the incorrect and shifted peak (e.g., plot 220) used for ToF calculation results in lidar inaccuracy. Outside a threshold range (e.g., target 181 outside threshold 180 in FIG. 1), the lidar inaccuracy attributed to walk error is relatively small. In various embodiments, walk error correction is applied only when the target distance is within a predetermined threshold distance.

Now referring back to FIG. 1. Histogram data is stored at memory 170. For a lidar system with more than one SPAD pixel circuit, the depths and bit widths of memory of each SPAD are defined according to operating parameters of the lidar system 100. These operating parameters include lidar range, resolution, SNR of a ToF system, and other factors. In various embodiments, within a single-frame interval as predefined for the lidar system, memory allocated to each SPAD is used for recording the number of times the SPAD generates a pulse in the corresponding time bin. For example, a memory block may include $2^n$ time bins, and each unit of memory address corresponds to the time bins. The DSP 160 performs walk error correction if needed and processes the histogram data stored at memory 170. For example, DSP 160 may perform various processes such as noise removal, ToF calculation, SPAD sensor offset (e.g., per pixel level), distance calculation, image reconstruction, and/or other functions. Depending on the implementation, functions performed at block 160 may be performed by other modules and/or the microprocessor.

Figure 3:
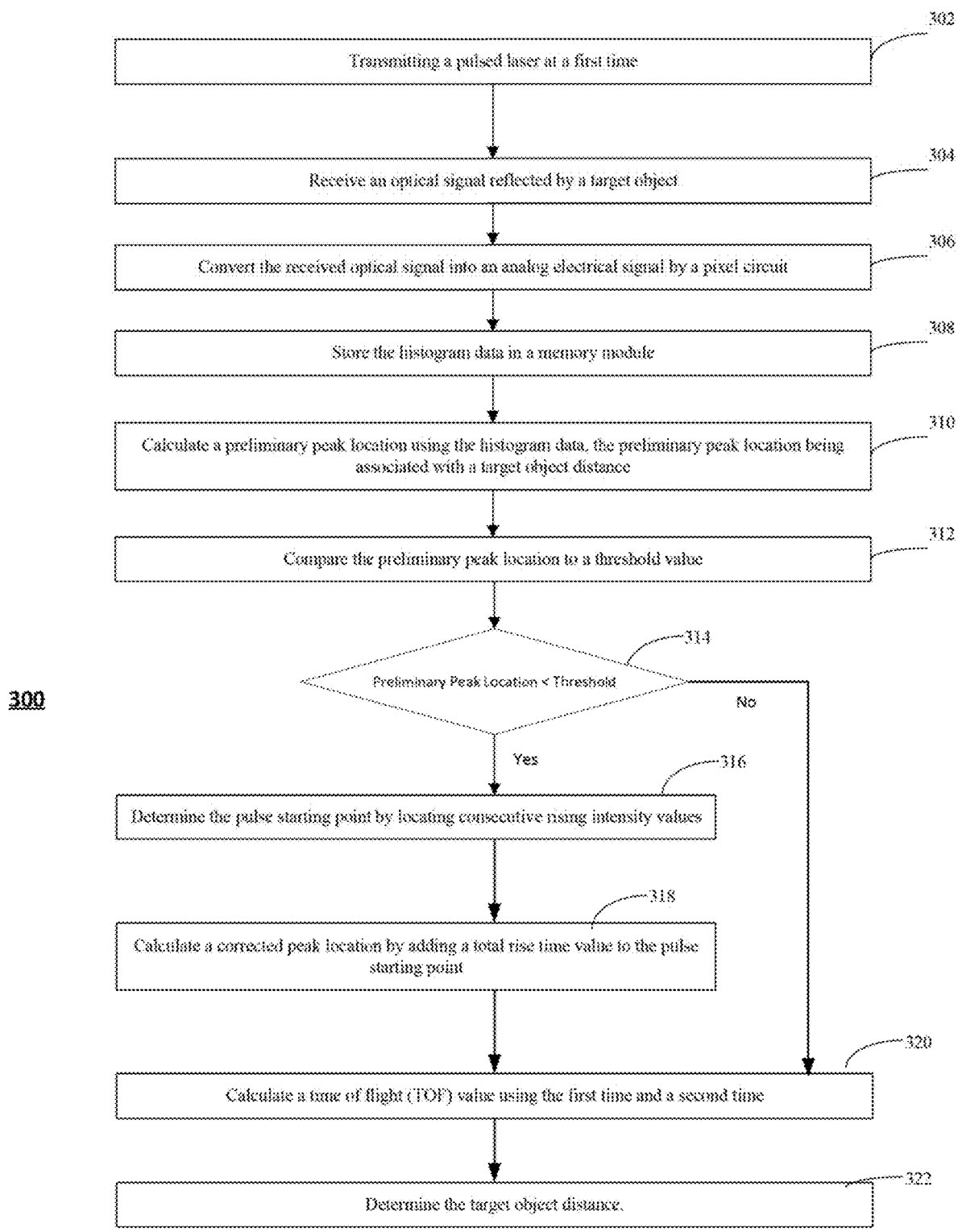
FIG. 3 is a simplified flow diagram illustrating a method for range determination with walk error correction according to embodiments of the present invention.

FIG. 3 is a simplified flow diagram illustrating a method for range determination with walk error correction according to embodiments of the present invention. This diagram is merely an example, which should not unduly limit the scope of the claims. One of ordinary skill in the art would recognize many variations, alternatives, and modifications. For example, one more steps may be added, removed, repeated, rearranged, overlapped, and/or modified, and should limit the scope of the claims.

Step 302. A pulsed laser is transmitted. For, example, the pulse laser is generated by laser source 110 and transmitted via lens 120, as shown in FIG. 1. The pulsed laser is by a distance between a pulse starting point and a pulse peak. In various embodiments, the pulsed laser's profile (width, rise time, intensity, etc.) may be optimized for later walk error correction.

At step 304, an optical signal reflected by a target object is received. For example, the pulsed laser is reflected from target 182 or 181 and received by lens 121.

At step 306, the received optical signal is converted into an analog electrical signal by a pixel circuit. For example, the pixel circuit comprises a SPAD pixel. In various embodiments, a SPAD pixel array converts the received optical signal, as directed by the optical elements at the receiving end, into multiple electrical signals. For example, SPAD sensor 140 is configured to perform the conversion from an optical signal to an electrical signal. The electrical signal is converted to histogram data by one or more TDCs. For example, a histogram data structure includes n blocks that correspond to n time bins that store n intensity values. For example, an intensity value is a function of the number of photons received during a predetermined time interval assigned to a time bin. For example, the conversion from an electrical signal to histogram data is performed by TDC 150. Depending on the implementation, TDC 150 may include a number of TDC circuits that correspond to the number of pixel circuits of SPAD sensor 140.

At step 308, the histogram data is stored in a memory module. In various embodiments, memory blocks (e.g., bytes) of a memory device corresponding to predefined time bins, and each of the memory blocks stores an intensity value (e.g., number of photons received within a predefined time interval).

As explained above, the histogram data stored at the memory module may need to be corrected for walk error. Walk error is more of a concern when the target object is within a predetermined threshold distance. For example, the predetermined threshold distance may be calculated using various parameters such as intensity level, size of laser pulse pattern, atmospheric conditions, etc. In certain embodiments, the predetermined threshold distance is obtained through empirical data. For example, for a lidar that is intended for mobile devices (e.g., smartphones and tablets) with a range of about five meters, the predetermined threshold distance may be about one meter; that is, within one meter, walk error correction is needed.

To decide whether to perform walk error correction, an estimate of target distance is compared to the predetermined threshold distance. At step 310, a preliminary peak location is calculated using the histogram data. The preliminary peak location is associated with a target object distance. In various implementations, the highest peak intensity value within a histogram data structure is located, and the corresponding time bin location is used as the preliminary peak location. The preliminary peak location is, to a certain extent, affected by the walk error, but for the purpose of deciding whether to perform walk error correction, the preliminary peak location suffices. It is to be understood that the term "preliminary peak location" could be a distance value or other values, such as a time bin value.

At step 312, the preliminary peak location is compared to a threshold value. For example, the threshold value corresponds to the threshold distance (e.g., threshold 180 in FIG. 1) within which walk error correction needs to be corrected. Since actual target distance requires ToF calculation and thus incurs computational costs, the threshold value could be a time bin value that corresponds to the threshold distance. Depending on the implementation, other types of threshold values may be used as well.

At step 314, if the preliminary peak location is less than the threshold value, walk error correction needs to be applied, step 316 is performed next; on the other hand, if the if peak location is greater than the threshold value, the walk error correction steps are skipped, and step 320 is performed next.

Figure 4:
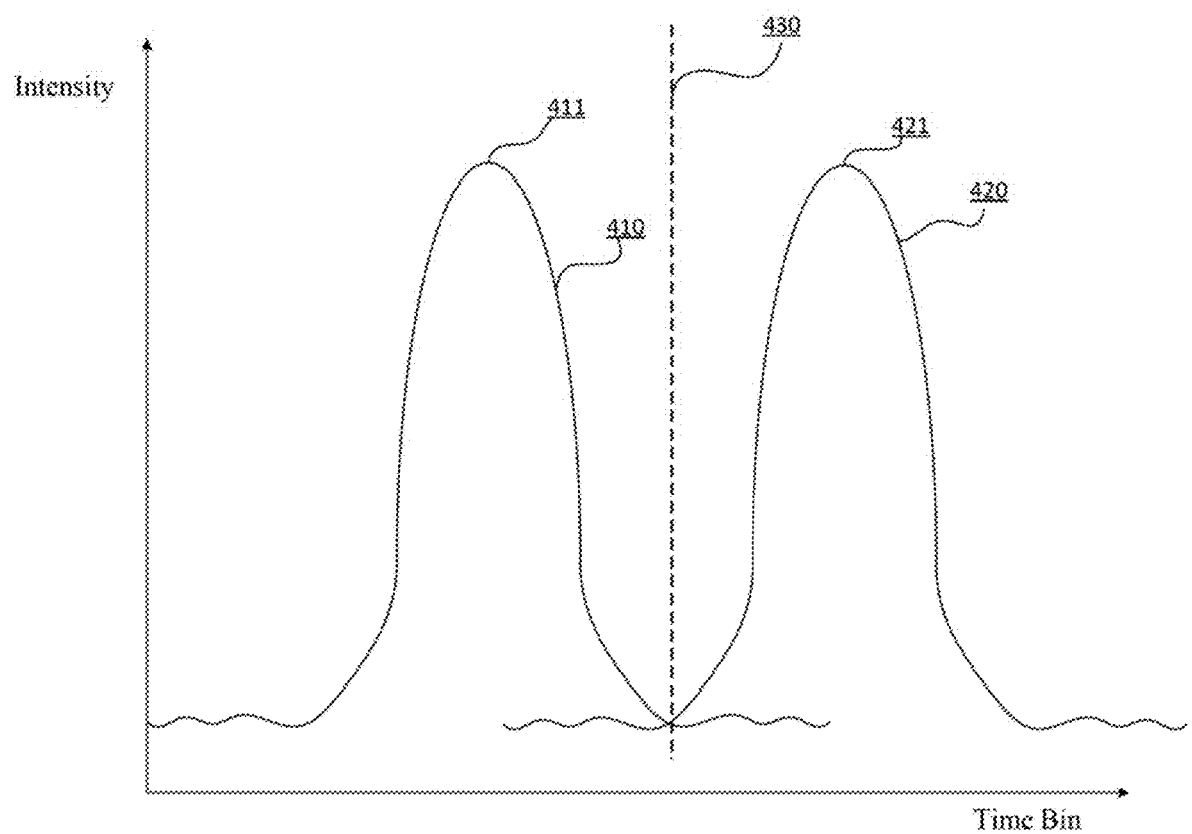
FIG. 4 is a simplified diagram illustrating conditions for applying walk error correction according to embodiments of the present invention.

FIG. 4 is a simplified diagram illustrating conditions for applying walk error correction according to embodiments of the present invention. This diagram is merely an example, which should not unduly limit the scope of the claims. One of ordinary skill in the art would recognize many variations, alternatives, and modifications. In FIG. 4, threshold 430 corresponds to a time bin location, which may be used as a threshold value corresponding to a predetermined threshold distance for walk error correction. The received pulse waveform 410, as reconstructed from the histogram, has its peak 411 positioned to the left (i.e., preliminary peak location being less than the threshold value) of the threshold 430, and walk error correction thus needs to be applied to waveform 410. The received pulse waveform 420, as reconstructed from the histogram, has its peak 421 positioned to the right (i.e., preliminary peak location being greater than the threshold value) of the threshold 430, and walk error correction does not need to be applied to waveform 420.

Now referring back to FIG. 3.

At step 316, the pulse starting point is determined. In various embodiments, the pulse starting point is obtained by locating m consecutive rising intensity values, wherein m is at least three (and m is five in a specific embodiment). The size of m depends on the shape of the transmitted laser pulse. For example, a laser pulse with a fast rise time is likely to result in a high SNR and low chance of "glitches" in the received laser pulse waveform, thereby allowing a low m size. In various embodiments, the profile of the laser pulse is specifically optimized to reduce m size and increase accuracy.

The m consecutive rising intensity values can be located in various ways. For example, in a histogram data structure with n time bins, between 0 and n−1 time bins, the differences between adjacent time bins are calculated, starting from time bin 0. For example, the intensity value stored at time bin 0 is $H_0$, the intensity value stored at time bin 1 is $H_1$, and so on, until $H_{n-1}$. The difference values are $D_0=H_1-H_0$, $D_1=H_2-H_1$. To find the first m consecutive rising values, a first string of m consecutive positive $D_1$ to $D_{1+m}$ differences is located, and the pulse starting point would be $H_1$. In some embodiments, difference values D are calculated/times, starting from $D_0$. In certain embodiments, the difference values D are calculated fewer times by starting from $D_k$, where k corresponds to a time bin position that is j time bin locations before the preliminary location. For example, j equals the total rise time R plus a predetermined constant (e.g., j=R+10 time bins, wherein R is the total rise time of the transmitted or measured laser pulse, and 10 is the predetermined constant). It is to be appreciated that the pulse starting point can be determined using other mechanisms as well.

In some implementations, the calculated pulse starting point must also be higher than a threshold intensity value, which is to preclude the possibility of m consecutive increases intensity values attributed to noise (especially when m is small).

Figure 5:
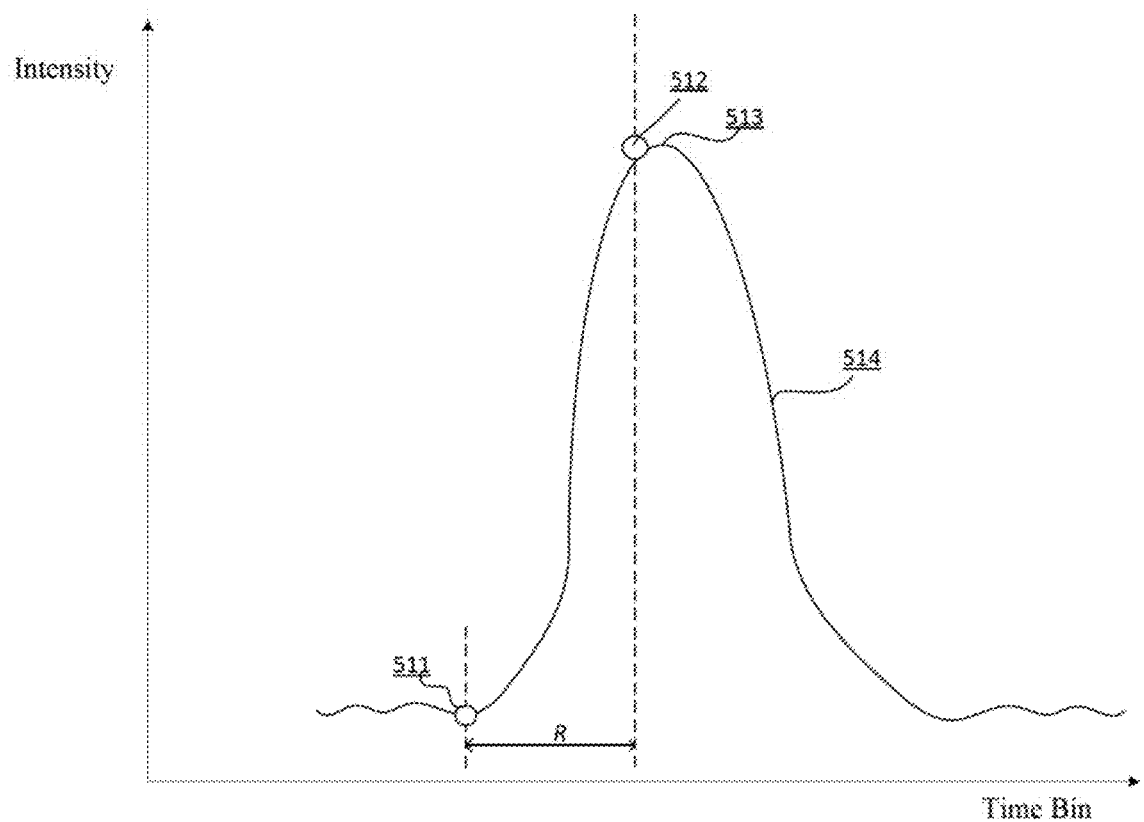
FIG. 5 is a simplified diagram illustrating a process of for calculating a corrected peak location according to embodiments of the present invention.

FIG. 5 is a simplified diagram illustrating a process of for calculating a corrected peak location according to embodiments of the present invention. This diagram is merely an example, which should not unduly limit the scope of the claims. One of ordinary skill in the art would recognize many variations, alternatives, and modifications. As shown in FIG. 5, the pulse starting point is at 511. As can be seen in FIG. 5, starting from point 511, the intensity value keeps going up, and the difference values D starting from point 511 are all positive until point 513 on the plot. Before point 511, the waveform as shown fluctuates up and down, corresponding to random noise.

Figure 6:
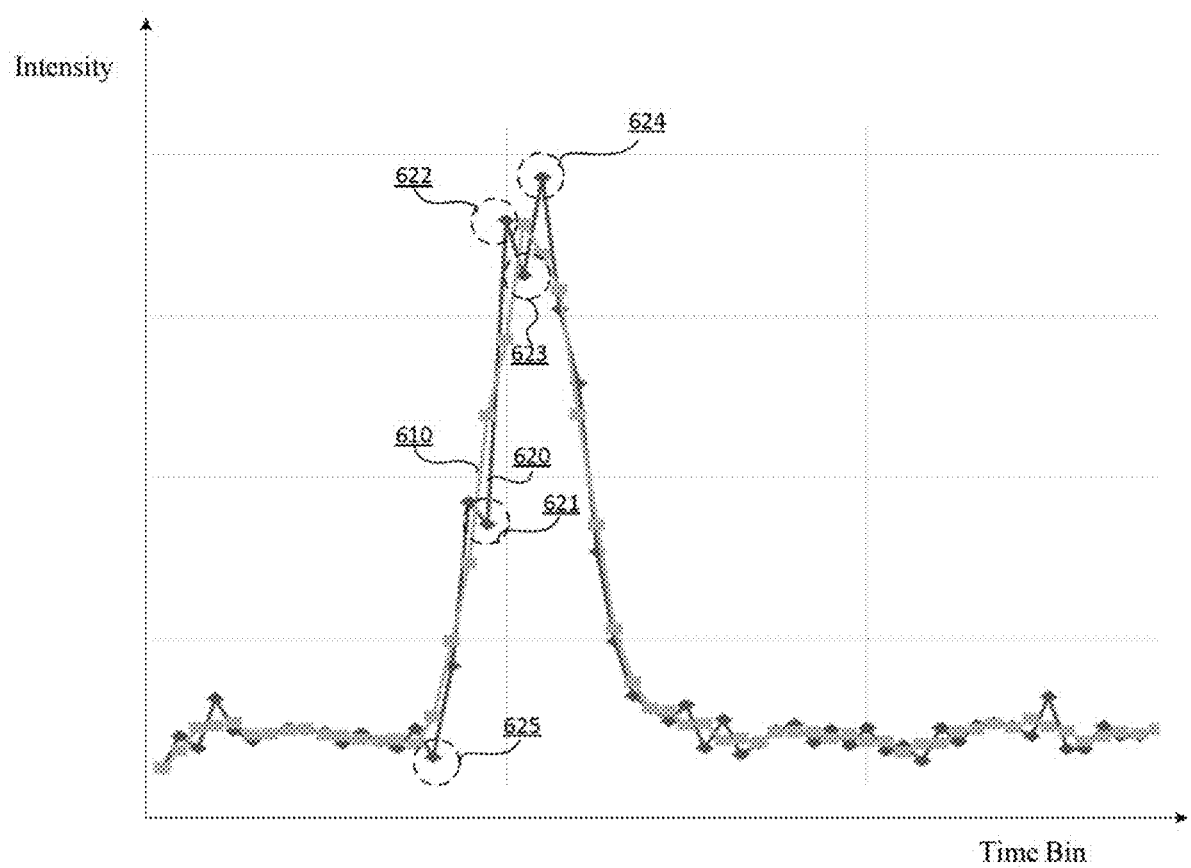
FIG. 6 is a simplified diagram illustrating a mean average filter applied to a histogram for pulse starting point determination according to embodiments of the present invention.

Due to noise, optical imperfections, and/or other factors, the receive pulse waveform may not be as smooth as shown in FIG. 5 and contains many ups and downs that adversely affect the accuracy of pulse starting point location. In various embodiments, a moving average filter is applied to the received waveform. FIG. 6 is a simplified diagram illustrating a moving average filter applied to a histogram for pulse starting point determination according to embodiments of the present invention. Plot line 620 is a received laser pulse waveform before filtering. For example, the "glitches" or drops at points 621, 623, and 625 may be caused by noise. Without applying the moving average filter, the pulse starting located using plot line 620 is likely to be incorrect, or not be found at all (e.g., small drops between intensity values started at adjacent time bins cause the m consecutive rising intensity values not to be found). Plot line 610 shows filtered laser pulse waveform, which is much smoother, and consecutive m consecutive rising intensity values are more likely to be correct. It is to be understood that moving average filter can be implemented in many ways. For example, intensity values $H_0$ to $H_{n-1}$ are modified to $H'_0$ to $H'_{n-1}$, where $$H'(0) = \sum_{h=0}^{a-1}\left(\frac{Hn}{a}\right),$$

wherein a is a predetermined number of consecutive intensity values for the moving average calculation. Other types of filters may be applied as well.

Now referring back to FIG. 3. At step 318, a corrected peak position is calculated by a distance P to the pulse starting point. For example, the corrected peak position may be represented as a time bin location that corresponds to a ToF value. As shown in Figure, the corrected peak position 512 is obtained by adding the total rise time value R to the pulse starting point 511. The total rise time value R can be obtained in various ways, depending on the specific implementation. For example, total rise time value R can be measured at the transmitting. In various embodiments, the total rise time value R is obtained from real data. For example, the total rise time value of the received laser pulse that is reflected from a target object that is further than the threshold distance (e.g., target object 181 in FIG. 1) is used to calculate the total rise time value R. It is to be understood that the total rise time value R may be expressed as time bin units. For example, the time bin corresponding to the corrected peak 512 (which is different from the preliminary peak location 513) is obtained by adding R time bin units to the time bin corresponding to the pulse starting point 511. As an example, a walk error correction process according to embodiments of the present invention may be performed by the control module 130 and/or DSP module 160 in FIG. 1. In various implementations, the corrected peak position (and/or the filtered intensity values H') is stored at memory 170.

It is to be appreciated that the corrected peak location, which compensates for walk error, may be incorrect due to noise or other errors. To ensure that the corrected peak location is actually correct, the corrected peak location is compared to a secondary peak location calculated using a match filter. The difference between the corrected peak location and the secondary peak location is compared to a threshold: if the difference is greater than the threshold, it is likely that the corrected peak location is incorrect, and the second peak location should be used instead; if the difference is less than the threshold, then the corrected peak location is likely to be corrected and can be used.

At step 320, a time of flight (ToF) value is calculated using either the preliminary peak location or the corrected peak location. For example, the preliminary peak location and the corrected peak locations correspond to the time that the received laser pulse reaches its peak. For example, ToF value is a function of a difference between the time when the laser pulse is transmitted (e.g., recorded by control module 130 when a "copy" of the laser pulse signal is received from splitter 122) and when the laser pulse is received (e.g., the received laser pulse peak—the corrected peak or the preliminary peak—corresponding to the receiving time).

In various embodiments, further digital signal processing functions may be performed to improve accuracy. For example, each of the SPAD pixel circuits (e.g., SPAD sensor 140 in FIG. 1) may be associated with an offset value that is obtained during a device calibration process. Depending on the implementation, the offset values may be applied at various steps (e.g., peak determination, ToF calculation, etc.).

At step 322, the target object distance is determined using the ToF value. For example, the round trip distance is the ToF multiplied by the speed of light c. Additional processes may be performed to ensure the accuracy of the distance calculation. In various embodiments, control module 130 includes non-volatile memory that stores instruction for performing various steps in FIG. 3.

According to an embodiment, the present invention provides a method that includes transmitting, by a transmitting end, a pulsed laser at a first time, the pulsed laser being characterized by a rise time between a pulse starting point and a pulse peak. The method also includes receiving an optical signal reflected by a target object. The method also includes converting the received optical signal into an analog electrical signal by a pixel circuit. The method also includes converting the analog electrical signal into histogram data using a time-to-digital converter (TDC), the histogram data may include n intensity values corresponding to n time bins. The method also includes storing the histogram data in a memory module. The method also includes calculating a preliminary peak location using the histogram data, the preliminary peak location being associated with a target object distance. The method also includes comparing the preliminary peak location to a threshold value. The method also includes if the preliminary peak location is less than the threshold value, determining the pulse starting point by locating m consecutive rising intensity values, and calculating a corrected peak location by adding a total rise time value to the pulse starting point, m being at least three, the second distance being associated with the first distance. The method also includes calculating a time of flight (ToF) value using the first time and a second time, the second time being based on the corrected peak location or the preliminary peak location. The method also includes determining the target object distance. Other embodiments of this aspect include corresponding computer systems, apparatus, and computer programs recorded on one or more computer storage devices, each configured to perform the actions of the methods.

Implementations may include one or more of the following features. The method may include applying a moving average filter to the histogram data. The second time is based on the preliminary peak location if the preliminary peak location is greater than the threshold value. The pulsed laser is characterized by a predetermined rise time that is optimized for detection of the pulse starting point. The method may include updating the histogram stored in the memory module based on the corrected peak location. The method may include applying an offset to the second time, the offset being based on a device characterization of the pixel circuit. The pixel circuit may include a single-photon avalanche diode (SPAD). Each of the m consecutive rising intensity values is greater than a threshold intensity value. The threshold value corresponds to a walk error distance range, the walk error distance range being associated with an accuracy requirement or an intensity of the pulsed laser. The preliminary peak location may include a time bin value or a distance value. The method may include determining the preliminary peak location using a match filter. The method may include comparing a difference between the corrected peak location and the second peak location to a predetermined value. Implementations of the described techniques may include hardware, a method or process, or computer software on a computer-accessible medium.

One general aspect includes a lidar system that includes a laser source configured to generate a pulsed laser at a first time, the pulsed laser being characterized by a predetermined distance between a pulse starting point and a pulse peak. The system also includes an optical module configured receiving a reflected laser signal. The system also includes a pixel circuit configured to generate an electrical output based on the reflected laser signal. The system also includes a time-to-digital converter (TDC) configured to generate a histogram data using at least the electrical output, the histogram data may include n intensity values corresponding to n time bins. The system also includes a memory device configured to store the histogram data. The system also includes a processor module configured to: calculate a preliminary peak location using the histogram data, the preliminary peak location being associated with a target object distance; compare the preliminary peak location to a threshold value; if the preliminary peak location is less than the threshold value, determine the pulse starting point by locating m consecutive rising intensity values, and calculate a corrected peak location by adding a total rise time values to the pulse starting point, m being at least three; and calculate a time of flight (TOF) value using the first time and a second time, the second time being based on the corrected peak location or the preliminary peak location; and determine the target object distance. Other embodiments of this aspect include corresponding computer systems, apparatus, and computer programs recorded on one or more computer storage devices, each configured to perform the actions of the methods.

Implementations may include one or more of the following features. The system where the memory device may include a static random-access memory (SRAM). The pixel circuit may include a single-photon avalanche diode (SPAD). The system may include an optical splitter coupled to the laser source and a control module, the control module being configured to activate the TDC in response to the pulsed laser. The processor module may include a digital signal processor (DSP). The system may include a diffractive optical element for output configured to replicate the pulsed laser. The system may include a data medium configured to store instructions, the processor module being configured to execute the instructions. The laser source is characterized by an output intensity optimized for a predetermined range, the threshold value being calibrated based on the predetermined range. Implementations of the described techniques may include hardware, a method or process, or computer software on a computer-accessible medium.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for range determination, the method comprising:
   transmitting, by a transmitting end, a pulsed laser at a first time, the pulsed laser being characterized by an initial total rise time between a pulse starting point and a pulse peak;
   receiving an optical signal reflected by a target object;
   converting the received optical signal into an analog electrical signal by a pixel circuit;
   converting the analog electrical signal into histogram data using a time-to-digital converter (TDC), the histogram data comprising n intensity values corresponding to n time bins;
   storing the histogram data in a memory module;
   calculating a preliminary peak location using the histogram data, the preliminary peak location being associated with a target object distance, the preliminary peak location being associated with a highest peak intensity value of and a corresponding time bin location of the histogram data;
   comparing the preliminary peak location to a threshold value, the threshold value being associated with a threshold distance;
   if the preliminary peak location is less than the threshold value, determining the pulse starting point by locating m consecutive rising intensity values, and calculating a corrected peak location by adding a total rise time value, m being at least three; and
   calculating a time of flight (TOF) value using the first time and a second time, the second time being based on the corrected peak location or the preliminary peak location; and
   determining the target object distance.

2. The method of claim 1 the total rise time value is determined using a reference total rise time associated with a reference received laser pulse, the reference received laser pulse having a reference peak location greater than the threshold value.

3. The method of claim 1 further comprising applying a moving average filter to the histogram data.

4. The method of claim 1 wherein the second time is based on the preliminary peak location if the preliminary peak location is greater than the threshold value.

5. The method of claim 1 wherein the pulsed laser is characterized by a predetermined rise time that is optimized for detection of the pulse starting point.

6. The method of claim 1 further comprising updating the histogram stored in the memory module based on the corrected peak location.

7. The method of claim 1 further comprising applying an offset to the second time, the offset being based on a device characterization of the pixel circuit.

8. The method of claim 1 wherein each of differences among adjacent m consecutive rising intensity values is greater than a threshold intensity value.

9. The method of claim 1 wherein each of the m consecutive rising intensity values is greater than a threshold intensity value.

10. The method of claim 1 wherein the threshold value corresponds to a walk error distance range, the walk error distance range being associated with an accuracy requirement or an intensity of the pulsed laser.

11. The method of claim 1 wherein the preliminary peak location comprises a time bin value or a distance value.

12. The method of claim 1 further comprising determining the preliminary peak location using a match filter.

13. The method of claim 1 further comprising comparing a difference between the corrected peak location and a second peak location to a threshold, the second peak location being calculated using a match filter.

14. A lidar system comprising:
   a laser source configured to generate a pulsed laser at a first time, the pulsed laser being characterized by total rise time between a pulse starting point and a pulse peak;
   an optical module configured receiving a reflected laser signal;
   a pixel circuit configured to generate an electrical output based on the reflected laser signal;
   a time-to-digital converter (TDC) configured to generate a histogram data using at least the electrical output, the histogram data comprising n intensity values corresponding to n time bins;
   a memory device configured to store the histogram data; and
   a processor module configured to:
      calculate a preliminary peak location using the histogram data, the preliminary peak location being associated with a target object distance;
      compare the preliminary peak location to a threshold value, the preliminary peak location being associated with a highest peak intensity value of and a corresponding time bin location of the histogram data;
      if the preliminary peak location is less than the threshold value, determine the pulse starting point by locating m consecutive rising intensity values, and calculate a corrected peak location by adding a total rise time value to the pulse starting point, m being at least three; and
      calculate a time of flight (TOF) value using the first time and a second time, the second time being based on a time bin location of the corrected peak location or the preliminary peak location; and
      determine the target object distance.

15. The system of claim 14 wherein the pixel circuit comprises a single-photon avalanche diode (SPAD).

16. The system of claim 14 further comprising an optical splitter coupled to the laser source and a control module, the control module being configured to activate the TDC in response to the pulsed laser.

17. The system of claim 14 wherein the processor module comprises a digital signal processor (DSP).

18. The system of claim 14 further comprising a diffractive optical element for output configured to replicate the pulsed laser.

19. The system of claim 14 further comprising a data medium configured to store instructions, the processor module being configured to execute the instructions.

20. The system of claim 14 wherein the laser source is characterized by an output intensity optimized for a predetermined range, the threshold value being calibrated based on the predetermined range.

* * * * *